United States Patent
Takenami et al.

(10) Patent No.: US 9,707,622 B2
(45) Date of Patent: Jul. 18, 2017

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Masataka Takenami, Aichi (JP); Satoshi Abe, Osaka (JP); Isamu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/123,101

(22) PCT Filed: Mar. 4, 2015

(86) PCT No.: PCT/JP2015/001155
§ 371 (c)(1),
(2) Date: Sep. 1, 2016

(87) PCT Pub. No.: WO2015/133137
PCT Pub. Date: Sep. 11, 2015

(65) Prior Publication Data
US 2017/0072464 A1 Mar. 16, 2017

(30) Foreign Application Priority Data
Mar. 5, 2014 (JP) ................... 2014-043102

(51) Int. Cl.
*B22F 3/105* (2006.01)
*B29C 67/00* (2017.01)
(Continued)

(52) U.S. Cl.
CPC ........ *B22F 3/1055* (2013.01); *B29C 67/0077* (2013.01); *B33Y 10/00* (2014.12);
(Continued)

(58) Field of Classification Search
CPC ... B23K 26/0093; B23K 26/16; B22F 3/1055; B22F 2003/1056; B22F 2003/247; B29C 67/0077
(Continued)

(56) References Cited

U.S. PATENT DOCUMENTS

5,014,207 A 5/1991 Lawton
5,753,171 A 5/1998 Serbin et al.
(Continued)

FOREIGN PATENT DOCUMENTS

EP 1 270 186 1/2003
JP 01-502890 10/1989
(Continued)

OTHER PUBLICATIONS

International Search Report issued in International Application No. PCT/JP2015/001155, dated May 26, 2015, along with English-language translation.
(Continued)

*Primary Examiner* — Jessee Roe
*Assistant Examiner* — Anthony Liang
(74) *Attorney, Agent, or Firm* — Greenblum & Bernstein, P.L.C.

(57) ABSTRACT

There is provided a selective laser sintering method capable of reducing the bulge of the peripheral portion corresponding to the periphery of the three-dimensional shaped object. The manufacturing method according to an embodiment of the present invention includes alternate repetition of a powder-layer forming and a solidified-layer forming, the repetition comprising: (i) forming a solidified layer by irradiating a predetermined portion of a powder layer with a light beam, thereby sintering the powder in the predetermined portion or a melting and subsequently solidifying the powder; and (ii) forming another solidified layer by newly forming a powder
(Continued)

layer on the formed solidified layer, followed by irradiation of a predetermined portion of the newly formed powder layer with the light beam, wherein a scanning of the light irradiation is divided into light beam-scannings "A" and "B".

7 Claims, 7 Drawing Sheets

(51) Int. Cl.
  *B33Y 10/00* (2015.01)
  *B33Y 50/02* (2015.01)
  *B22F 3/24* (2006.01)

(52) U.S. Cl.
  CPC ....... *B33Y 50/02* (2014.12); *B22F 2003/1057* (2013.01); *B22F 2003/247* (2013.01); *Y02P 10/295* (2015.11)

(58) Field of Classification Search
  USPC ............................................ 419/28; 264/497
  See application file for complete search history.

(56) References Cited

U.S. PATENT DOCUMENTS

| | | |
|---|---|---|
| 5,932,059 A | 8/1999 | Langer et al. |
| 5,985,204 A | 11/1999 | Otsuka et al. |
| 2003/0001312 A1 | 1/2003 | Nguyen et al. |
| 2004/0061260 A1 | 4/2004 | Heugel |
| 2015/0017055 A1 | 1/2015 | Abe et al. |
| 2015/0183165 A1 | 7/2015 | Abe et al. |

FOREIGN PATENT DOCUMENTS

| | | | |
|---|---|---|---|
| JP | 8-504139 | 5/1996 | |
| JP | 10-505799 | 6/1998 | |
| JP | 11-5254 | 1/1999 | |
| JP | 2000-073108 | 3/2000 | |
| JP | 2002-160301 | 6/2002 | |
| JP | 2003-062914 | 3/2003 | |
| JP | 2004-130793 | 4/2004 | |
| JP | 2008-155538 | 7/2008 | |
| JP | 2011-021218 | 2/2011 | |
| JP | 2012-224907 | 11/2012 | |
| JP | 2013-163829 | 8/2013 | |
| JP | WO 2013132840 A1 * | 9/2013 | ............ B22F 3/1055 |
| WO | 88/02677 | 4/1988 | |
| WO | 2013/132840 | 9/2013 | |
| WO | 2014/010144 | 1/2014 | |

OTHER PUBLICATIONS

English Translation of International Preliminary Report on Patentability issued in International Application No. PCT/JP2015/001155, dated Sep. 6, 2016.

Extended European Search Report for EP 15758166.1 having a mailing date of Feb. 6, 2017.

* cited by examiner

METHOD FOR MANUFACTURING THREE-DIMENSIONAL SHAPED OBJECT

TECHNICAL FIELD

The disclosure relates to a method for manufacturing a three-dimensional shaped object. More particularly, the disclosure relates to a method for manufacturing a three-dimensional shaped object, in which a formation of a solidified layer is performed by an irradiation of a powder layer with a light beam.

BACKGROUND OF THE INVENTION

Heretofore, a method for manufacturing a three-dimensional shaped object by irradiating a powder material with a light beam has been known (such method can be generally referred to as "selective laser sintering method"). The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder or a melting and subsequent solidification of the predetermined portion; and (ii) forming another solidified layer by newly forming a powder layer on the formed solidified layer, followed by similarly irradiating the powder layer with the light beam. See JP-T-01-502890 or JP-A-2000-73108, for example.

This kind of technology makes it possible to produce the three-dimensional shaped object with its complicated contour shape in a short period of time. The three-dimensional shaped object can be used as a metal mold in a case where inorganic powder material (e.g., metal powder material) is used as the powder material. While on the other hand, the three-dimensional shaped object can also be used as various kinds of models or replicas in a case where organic powder material (e.g., resin powder material) is used as the powder material.

Figure 6A:
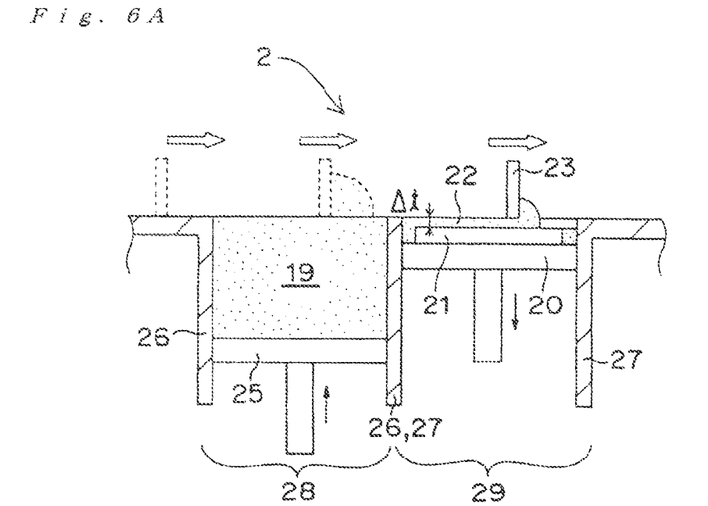
Figure 6B:
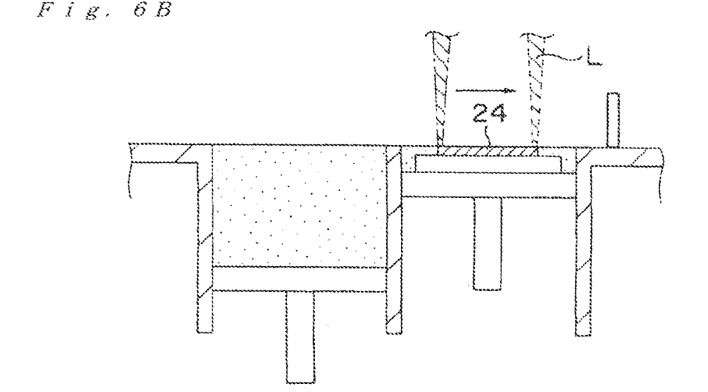
Figure 6C:
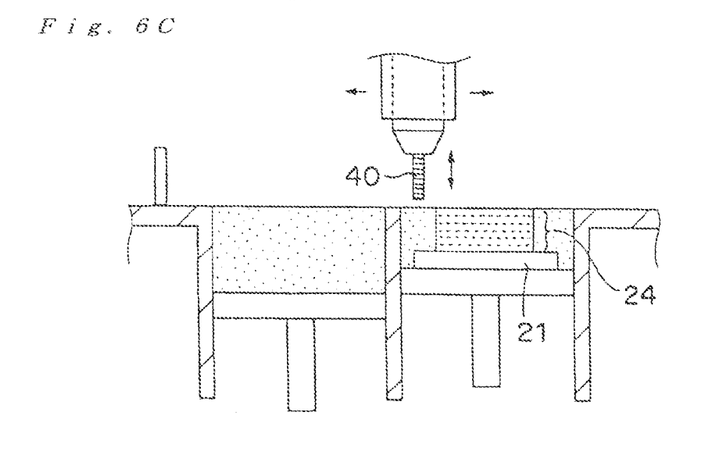

Taking a case as an example wherein the metal powder is used as the powder material, and the three-dimensional shaped object produced therefrom is used as the metal mold, the selective laser sintering method will now be briefly described. As shown in FIGS. 6A-6C, a powder layer 22 with its predetermined thickness is firstly formed on a base plate 21 by spreading powder 19 through a movement of a squeegee blade 23 (FIG. 6A). Then, a predetermined portion of the powder layer is irradiated with a light beam "L" to form a solidified layer 24 (see FIG. 6B). Another powder layer is newly provided cn the solidified layer thus formed, and is irradiated again with the light beam to form another solidified layer. In this way, the powder-layer forming and the solidified-layer forming are alternately repeated, and thereby allowing the solidified layers 24 to be stacked with each other (see FIG. 6C). The alternate repetition of the powder-layer forming and the solidified-layer forming leads to a production of a three-dimensional shaped object with a plurality of the solidified layers integrally stacked therein. The lowermost solidified layer 24 can be provided in a state of being adhered to the surface of the base plate 21. Therefore, there can be obtained an integration of the three-dimensional shaped object and the base plate. The integrated "three-dimensional shaped object" and "base plate" can be used as the metal mold as they are.

PATENT DOCUMENTS

Related Art Patent Documents

PATENT DOCUMENT 1: Japanese Unexamined Patent Application Publication No. H01-502890
PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found such a phenomenon that a scanning of the light beam can bring about a bulge in the solidified layer. Specifically, the inventors have found that the bulge, which is presumed to be attributed to the scanning condition, can occur especially in a case where the scanning for the light irradiation is divided into sub-scans for "peripheral portion" and "internal portion", the peripheral portion corresponding to an outer surface portion of the three-dimensional shaped object, i.e., an outer peripheral contour of the object, the internal portion corresponding to an internal region located inside the outer surface portion of the three-dimensional shaped object. In particular, the inventors have found that a high-speed scanning of a high-power light beam, which can efficiently contribute to the formation of the solidified layer, can cause the bulge 80 to occur at the peripheral portion corresponding to the periphery of the three-dimensional shaped object (see FIG. 9).

More specifically, the occurrence of the bulge becomes much more pronounced in a case where the high-speed scanning of the high-power light beam for the efficient formation of the solidified layer is subjected to both of the peripheral portion and the internal portion.

Figure 9:
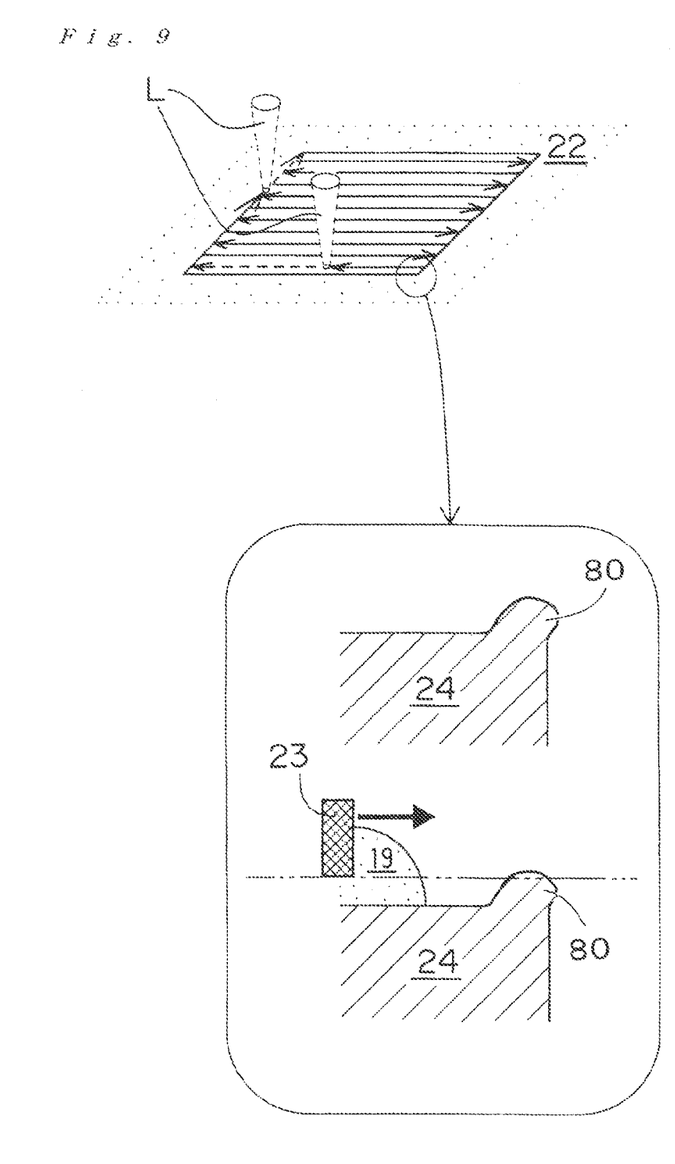
FIG. 9 includes schematic views illustrating the phenomenon found by the inventors of the present application.

Once the bulge 80 occurs, the squeegee blade 23 is likely to collide with the bulge 80 at the time of the powder-layer forming, which will cause the formation of the powder layer to be inhibited (FIG. 9). Specifically, when the squeegee blade 23 is driven to move to spread the powder 19 for the purpose of forming the powder layer, the movement of the squeegee blade 23 can be adversely inhibited by the presence of the bulge 80.

Under these circumstances, the present invention has been created. That is, an object of the present invention is to provide the selective laser sintering method which is capable of reducing the bulge of the peripheral portion corresponding to the periphery of the three-dimensional shaped object.

Means for Solving the Problems

In order to achieve the above object, an embodiment of the present invention provides a method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder; and (ii) forming another solidified layer by newly forming a powder layer on the formed solidified layer, followed by irradiation of a predetermined portion of the newly formed powder layer with the light beam, wherein a scanning of the light irradiation is divided into light beam-scannings "A" and "B", the light beam-scanning "A" being for the light irradiation of a peripheral portion corresponding to a periphery of the three-dimensional shaped object, the light beam-scanning "B" being for the light irradiation of an internal portion corresponding to a region of the three-dimensional shaped object, the region being located inside the periphery, and wherein a relative adjustment of a peak power "P" between the light beam-scannings "A" and "B" is performed such that a peak power $P_A$ of the light beam for the peripheral portion is lower than a peak power $P_B$ of the light beam for the internal portion.

Effect of the Invention

The relative adjustment of the peak power "P" between "peripheral portion" and "internal portion" in accordance with an embodiment of the present invention makes it possible to reduce the bulge of the peripheral portion. As such, the manufacturing method according to an embodiment of the present invention can avoid such a problem that the squeegee blade collides with the bulge at the time of the powder-layer forming, the collision causing the inhabitation of the formation of the powder layer.

BRIEF DESCRIPTION OF THE DRAWINGS

FIGS. 5 A and 5B schematically illustrate a preferred embodiment of the present invention wherein a plurality of irradiation paths in a linear form are in parallel with each other at a peripheral portion corresponding to a periphery of a three-dimensional shaped object.

FIGS. 6 A-C include cross-sectional views schematically illustrating a laser-sintering/machining hybrid process wherein a machining is additionally carried out in the selective laser sintering method.

MODES FOR CARRYING OUT THE INVENTION

The manufacturing method according to an embodiment of the present invention will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to form a shape of a three-dimensional shaped object. Furthermore, the term "solidified layer" substantially means a "sintered layer" in a case where the powder layer is a metal powder layer, whereas term "solidified layer" substantially means a "cured layer" in a case where the powder layer is a resin powder layer.

[Selective Laser Sintering Method]

Figure 7:
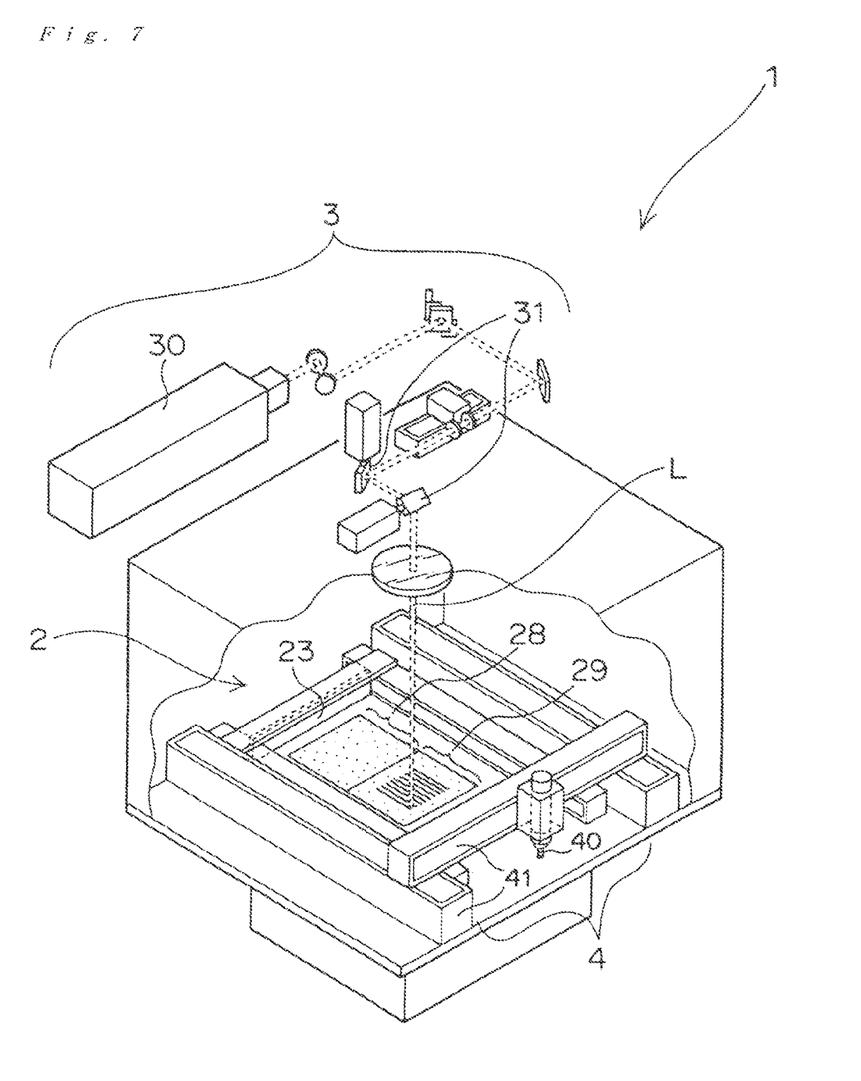
FIG. 7 is a perspective view schematically illustrating a construction of a laser-sintering/machining hybrid machine.
Figure 8:
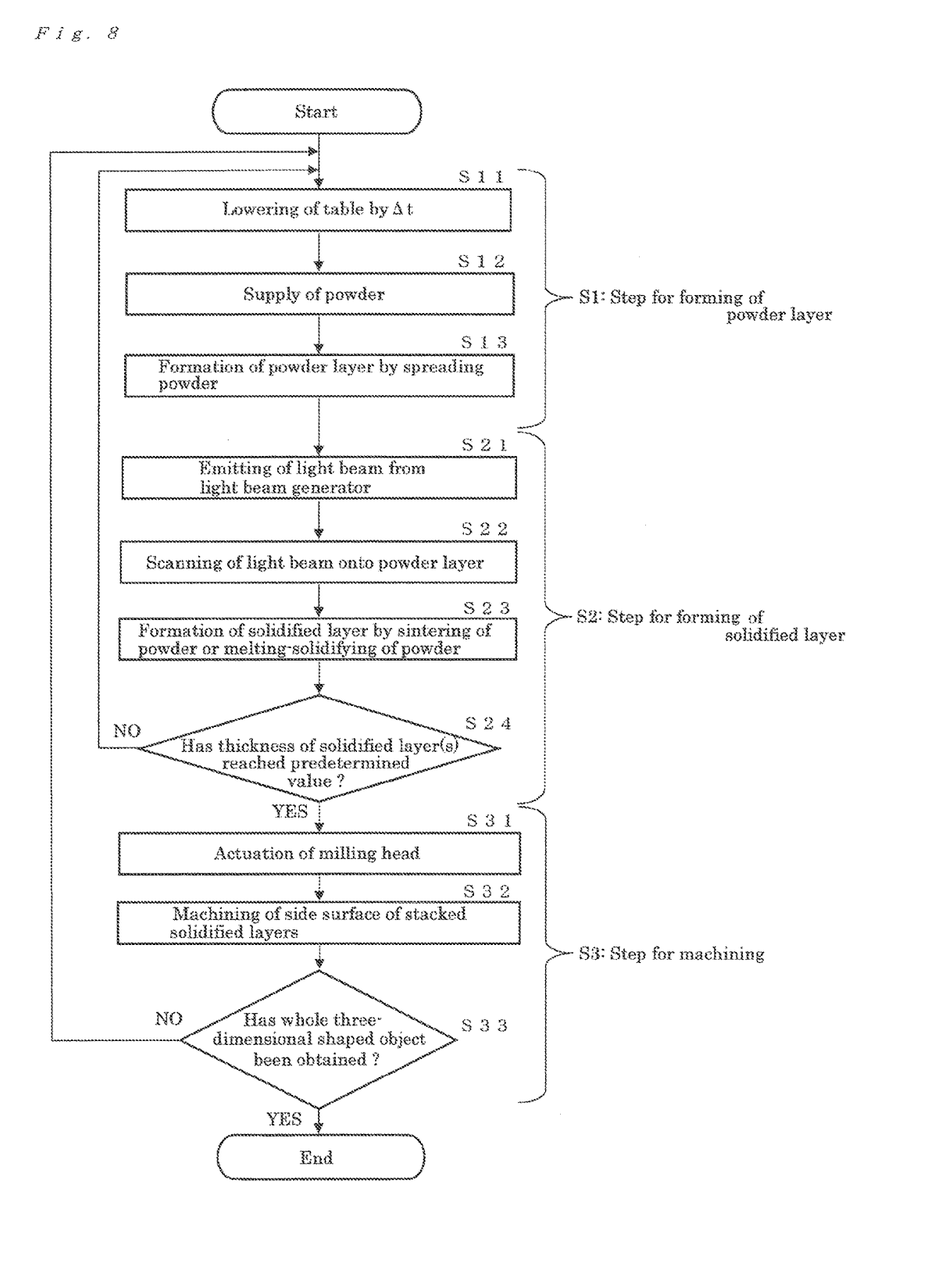
FIG. 8 is a flow chart of general operations of a laser-sintering/machining hybrid machine.

First of all, a selective laser sintering method, on which an embodiment of the manufacturing method of the present invention is based, will be described. By way of example, a laser-sintering/machining hybrid process wherein a machining is additionally carried out in the selective laser sintering method will be explained. FIG. 6 schematically shows a process embodiment of the laser-sintering/machining hybrid. FIGS. 7 and 8 respectively show major constructions and operation flow regarding a metal laser sintering hybrid milling machine for enabling an execution of a machining process as well as the selective laser sintering method.

As shown in FIGS. 6 and 7, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder). The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

As shown in FIGS. 6A-6C, the powder layer former 2 is mainly composed of a powder table 25, a squeegee blade 23, a forming table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is a plate for a shaped object. The base plate is disposed on the forming table 20 and serves as a platform of the three-dimensional shaped object.

As shown in FIG. 7, the light-beam irradiator 3 is mainly composed of a light beam generator 30 and a galvanometer mirror 31. The light beam generator 30 is a device for emitting a light beam "L". The galvanometer mirror 31 is a means for scanning an emitted light beam "L" onto the powder layer, i.e., a scan means of the light beam "L".

As shown in FIG. 7, the machining means 4 is mainly composed of a milling head 40 and an actuator 41. The milling head 40 is a cutting tool for milling the side surface of the stacked solidified layers, i.e., the surface of the three-dimensional shaped object. The actuator 41 is a means for driving the milling head 40 to move toward the position to be milled.

Operations of the laser sintering hybrid milling machine 1 will now be described in detail. As can been seen from the flowchart of FIG. 8, the operations of the laser sintering hybrid milling machine are mainly composed of a powder layer forming step (S1), a solidified layer forming step (S2), and a machining step (S3). The powder layer forming step (S1) is a step for forming the powder layer 22. In the powder layer forming step (S1), first, the forming table 20 is descended by Δt (S11), and thereby creating a level difference "Δt" between an upper surface of the base plate 21 and an upper-edge plane of the forming tank 29. Subsequently, the powder table 25 is elevated by Δt, and then the squeegee blade 23 is driven to move from the storage tank 28 to the forming tank 29 in the horizontal direction, as shown in FIG. 6A. This enables a powder 19 placed on the powder table 25 to be spread onto the base plate 21 (S12), while forming the powder layer 22 (S13). Examples of the powder for the powder layer include a "metal powder having a mean particle diameter of about 5 μm to 100 μm" and a "resin powder having a mean particle diameter of about 30 μm to 100 μm, (e.g., a powder of nylon, polypropylene, ABS or the like)". Following this step, the solidified layer forming step (S2) is performed. The solidified layer forming step (S2) is a step for forming a solidified layer 24 through the light beam irradiation. In the solidified layer forming step (S2), a light beam "L" is emitted from the light beam generator 30 (S21). The emitted light beam "L" is scanned onto a predetermined portion of the powder layer 22 by means of the galvanometer mirror 31 (S22). The scanned light beam can cause the powder in the predetermined portion of the powder layer to be sintered or be melted and subsequently solidified, resulting in a formation of the solidified layer 24 (S23), as shown in FIG. 6B. Examples of the light beam "L" include carbon dioxide gas laser, Nd:YAG laser, fiber laser, ultraviolet light and the like.

The powder layer forming step (S1) and the solidified layer forming step (S2) are alternately repeated. This allows a plurality of the solidified layers 24 to be integrally stacked with each other, as shown in FIG. 6C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The milling head 40 (see FIG. 6C and FIG. 7) is actuated to initiate an execution of the machining step (S31). For example, in a case where the milling head 40 has an effective milling length of 3 mm, a machining can be performed with a milling depth of 3 mm. Therefore, supposing that "Δt" is 0.05 mm, the milling head 40 is actuated when the formation of the sixty solidified layers 24 is completed. Specifically, the side face of the stacked solidified layers 24 is subjected to the surface machining (S32) through a movement of the milling head 40 driven by the actuator 41. Subsequent to the surface machining step (S3), it is judged whether or not the whole three-dimensional shaped object has been obtained (S33). When the desired three-dimensional shaped object has not yet been obtained, the step returns to the powder layer forming step (S1). Thereafter, the steps S1 through S3 are repeatedly performed again wherein the further stacking of the solidified layers 24 and the further machining process therefor are similarly performed, which eventually leads to a provision of the desired three-dimensional shaped object.

[Manufacturing Method of the Present Invention]

An embodiment of the present invention is characterized by features associated with a scanning condition of the light beam in the selective laser sintering method as described above.

Figure 1:
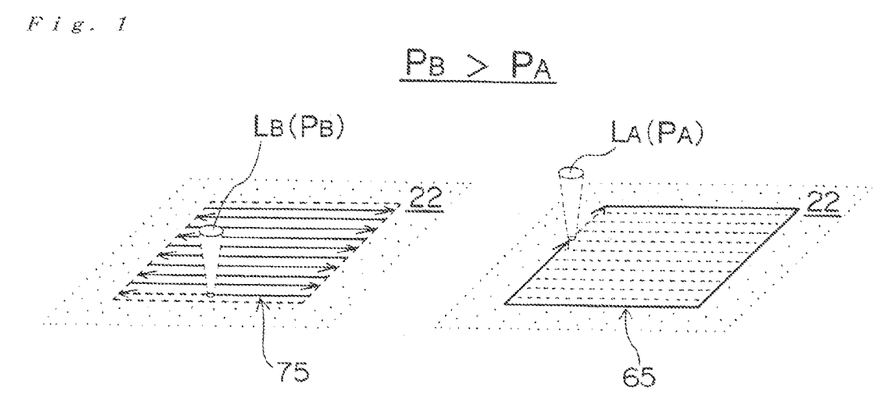
FIG. 1 includes schematic views showing a general concept according to an embodiment of the present invention.

Specifically, a scanning of the light beam according to an embodiment of the present invention is divided into light beam-scannings "A" and "B", the light beam-scanning "A" being for the light irradiation of a peripheral portion corresponding to a periphery of the three-dimensional shaped object, and the light beam-scanning "B" being for the light irradiation of an internal portion corresponding to a region of the three-dimensional shaped object, the region being located inside the periphery. In FIG. 1, the light beam-scanning "A" is indicated by the reference numeral "65", whereas the light beam-scanning "B" is indicated by the reference numeral "75". According to an embodiment of the present invention, a relative adjustment of a peak power "P" between the light beam-scannings "A" and "B" is performed. More specifically, the relative adjustment of the peak power "P" is performed such that a peak power $P_A$ of the light beam $L_A$ for "peripheral portion corresponding to the periphery of the three-dimensional shaped object" is lower than a peak power $P_B$ of the light beam $L_B$ for "internal portion corresponding to the internal region of the three-dimensional shaped object" (see FIG. 1). In other words, the peak power $P_A$ for "peripheral portion corresponding to the periphery of the three-dimensional shaped object" is made lower than the peak power $P_B$ for "internal portion corresponding to the internal region of the three-dimensional shaped object".

As such, the manufacturing method according to an embodiment of the present invention relatively adjusts the scanning condition of the light beam between the light beam-scannings "A" and "3".

The relative adjustment of the scanning condition of the light beam according to an embodiment of the manufacturing method of the present invention can reduce the bulge which may occur upon the forming of the solidified layer. More specifically, when the peak power "P" is adjusted such that the peak power $P_A$ for "peripheral portion corresponding to the periphery of the three-dimensional shaped object" is lower than the peak power $P_B$ for "internal portion corresponding to the internal region of the three-dimensional shaped object", the occurrence of the bulge can be suppressed especially at "peripheral portion corresponding to the periphery of the three-dimensional shaped object". This means that the manufacturing method according to an embodiment of the present invention can reduce the bulge of the peripheral portion even in a case where the scanning of the light irradiation is divided into one for "peripheral portion corresponding to the periphery of the three-dimensional shaped object" and the other for "internal portion corresponding to a region of the three-dimensional shaped object, the region being located inside the periphery".

Take an example wherein the same scanning condition of the light beam is subjected to both of "peripheral portion corresponding to periphery of three-dimensional shaped object" and "internal portion corresponding to internal region of three-dimensional shaped object", it is then presumed that the peripheral portion tends to bulge due to a solidification of the excessive amount of the powder. More specifically, it can be presumed that the bulge easily occurs at the peripheral portion since the melting of the excessive amount of the powder, which is partly due to a supply of the powder from the surrounding powder portion, brings about the surface tension of the melted powder at such peripheral portion.

The manufacturing method according to an embodiment of the present invention wherein the peak power $P_A$ for "peripheral portion corresponding to the periphery of the three-dimensional shaped object" is made lower than the peak power $P_B$ for "internal portion corresponding to the internal region of the three-dimensional shaped object" can avoid the melting of the excessive amount of the powder. This makes it possible to reduce the bulge, especially a peripheral bulge which can occur at the "peripheral portion corresponding to periphery of three-dimensional shaped object". As a result, there can be avoided such a problem that the squeegee blade 23 collides with the bulge at the time of the formation of the powder layer 22, the collision causing the formation of the powder layer to be inhibited.

The term "periphery" used herein means an outer surface section of the three-dimensional shaped object, i.e., an outer peripheral contour of the three-dimensional shaped object. In other words, the phrase "peripheral portion corresponding to a periphery of the three-dimensional shaped object" used herein corresponds to a peripheral section of "region of three-dimensional shaped object to be manufactured" defined in the powder layer. The periphery in the present invention may be regarded as having a width dimension in the outer peripheral contour of the three-dimensional shaped object, and thus the periphery in the present invention may correspond to a local portion which extends from the outermost surface of the three-dimensional shaped object to the inner point (i.e., the horizontal direction inner point) by about 0.01 mm to about 3 mm, preferably by about 0.05 mm to about 0.3 mm. While on the other hand, term "the region being located inside the periphery" used herein means that a solid section of the three-dimensional shaped object. In other words, the phrase "internal portion corresponding to a region of the three-dimensional shaped object, the region being located inside the periphery" used herein corresponds to a section other than the peripheral section of "region of the three-dimensional shaped object to be manufactured" defined in the powder layer.

Figure 2:
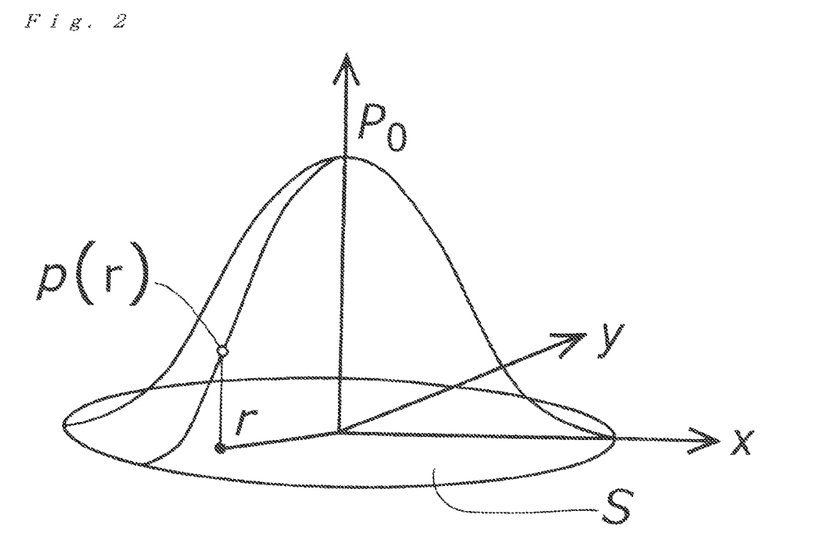
FIG. 2 shows a power profile of light beam.

The term "peak power "P"" used herein means a maximum power in a power profile of a light beam having Gaussian distribution as shown in FIG. 2. The unit of the peak power "P" is watt, i.e., [W], for example. More specifically, with respect to an equation as shown below, the equation representing the power profile of the Gaussian distribution shown in FIG. 2, the peak power "P" corresponds to p(0) at r=0 (see Satoshi Abe et al. Doctor thesis "Development research on metal laser sintering hybrid milling process and metal mold", Function Creation Systems, Graduate School of Science and Technology, Kanazawa University, Mar. 31, 2008, pages 52-53)

$$P = \int_S p(r) dS = \int_S P_0 \exp\left(-\frac{r^2}{2\sigma^2}\right) dS \quad \text{[Equation 1]}$$

(P [W]: Power of light beam, $P_0$ [W]: Peak power, r [mm]: Light collection radius (Spot diameter/2), σ [–]: Standard deviation, S [mm²]: Light collection area)

In the manufacturing method according to an embodiment of the present invention, the relative adjustment of the peak power "P" is performed between the light beam-scanning "A" and the light beam-scanning "B". Specifically, the peak power $P_A$ of the light beam irradiation for "peripheral portion corresponding to the periphery of the three-dimensional shaped object" is made lower than the peak power $P_B$ of the light beam irradiation for "internal portion corresponding to the internal region of the three-dimensional shaped object". For example, the peak power $P_A$ is made lower than the peak power $P_B$, preferably by 30% to 80%, more preferably by 40% to 70%.

Figure 3:
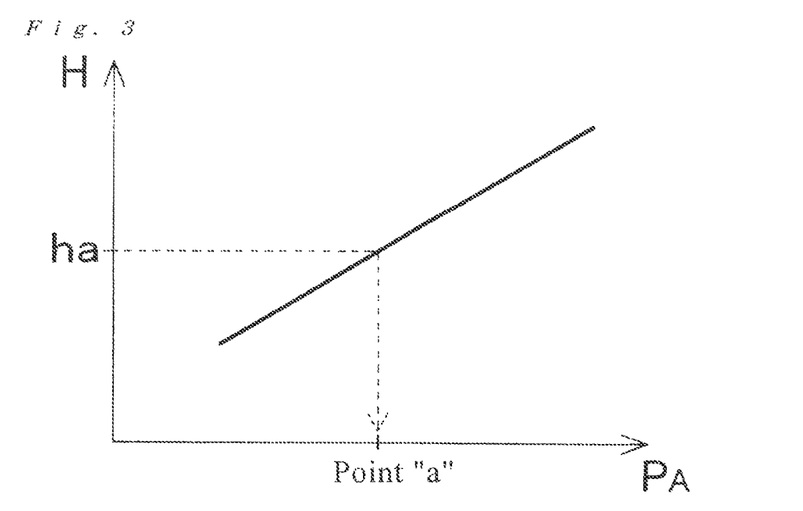
FIG. 3 shows a correlation between "peak power $P_A$" and "bulge height H of a peripheral portion corresponding to a periphery of a three-dimensional shaped object".

The specific value of the peak power $P_A$ of the light beam irradiation for "peripheral portion corresponding to the periphery of the three-dimensional shaped object" can be preferably determined based on a correlation between the peak power "$P_A$" and the bulge height "H" of the peripheral portion corresponding to the periphery of the three-dimensional shaped object. This will be now described in detail. Under such a condition that the energy density of the light beam is constant, there can be provided approximately a proportional relationship between "peak power $P_A$" and "bulge height H of the peripheral portion corresponding to periphery of three-dimensional shaped object". This means that the specific value of the peak power $P_A$ can be derived from the thickness of the powder layer to be formed (i.e., a gap dimension "$h_a$" between the squeegee blade and the base plate upon the powder-layer forming). Based on the graph of FIG. 3 for example, when the light beam scanning "A" is performed with the peak power $P_A$ being lower than the value of point "a" derived from "$h_a$", the bulge, if any, may have the height which is smaller than the gap dimension between the squeegee blade and the base plate upon the powder-layer forming. As a result, the squeegee blade cannot collide with the bulge at the time of the powder-layer forming, and thereby the formation of the powder layer cannot be adversely inhibited.

In the manufacturing method according to an embodiment of the present invention, the relative adjustment of the peak power "P" is performed such that an output of the light beam is relatively changed between the light beam-scannings "A" and "B". That is, the relative adjustment between the peak power $P_A$ and the peak power $P_B$ may be performed by relatively changing the output of the light beam between the light beam-scannings "A" and "B". Specifically, the peak power $P_A$ can be made lower than the peak power $P_B$ by making the light beam output $U_A$ for the light beam-scanning "A" lower than the light beam output $U_B$ for the light beam-scanning "B".

Alternatively, the relative adjustment between the peak power $P_A$ and the peak power $P_B$ can be performed by relatively changing a spot diameter of the light beam between the light beam-scannings "A" and "B". Specifically, the peak power $P_A$ can be made lower than the peak power $P_B$ by making the spot diameter $D_A$ of the light beam for the light beam-scanning "A" larger than the spot diameter $D_B$ of the light beam for the light beam-scanning "B".

The relative adjustment of the peak power $P_A$ by the change of the light beam output or another change of the spot diameter of the light beam is a relatively simple operation. From a common point of view, it is hard to predict the extent of "bulge" which occurs at the peripheral portion corresponding to the periphery of the three-dimensional shaped object, and thus it is difficult to design the three-dimensional shaped object based on a preliminary assumption of the extent of such bulge thereof. The manufacturing method according to an embodiment of the present invention can exclude such difficult design, i.e., the difficulty regarding such unpredictable phenomenon of the bulge occurrence by "relatively simple adjustment of the light beam".

In the manufacturing method according to an embodiment of the present invention, the light beam is preferably scanned such that the light beam-scanning "B" is performed prior to the light beam-scanning "A". That is, it is preferred that the light beam-scanning "B" for the light beam irradiation of "internal portion corresponding to the internal region of the three-dimensional shaped object" is performed, and thereafter the light beam-scanning "A" for the light beam irradiation for "peripheral portion corresponding to the periphery of the three-dimensional shaped object" is performed. This makes it possible to effectively reduce the melted amount of the powder at the surrounding region of the peripheral portion upon the light beam irradiation, which can lead to an effective suppression of the bulge occurrence at the peripheral portion corresponding to the periphery of the three-dimensional shaped object.

In a preferred embodiment of the present invention, an energy density of the light beam is made the same between the light beam-scannings "A" and "B". That is, the energy density of the light beam for the peripheral portion corresponding to the periphery of the three-dimensional shaped object and the energy density of the light beam for the internal portion corresponding to the internal region of the three-dimensional shaped object may be made the same as each other under such a condition that the peak power $P_A$ for the peripheral portion is lower than the peak power $P_B$ for the internal portion. This allows the periphery of the three-dimensional shaped object and the internal portion thereof to have substantially the same density of the solidified layer (i.e., the same solidified density) as each other.

The term "energy density of light beam" used herein means can be expressed by the following equation:

$$E = U \times \frac{1}{V \cdot D}$$

wherein,
E [J/mm$^2$]: Energy density
U [W]: Light beam output
V [mm/s]: Scanning speed
D [mm]: Spot diameter.

The embodiment according to "the same energy density" makes it possible to suppress the occurrence of the bulge at the peripheral portion corresponding to the periphery of the three-dimensional shaped object, while making the density of the periphery of the object the same as that of the internal portion thereof, not making the density of the periphery lower than that of the internal portion. In a case where a metal powder is used as the powder material, the "solidified density" corresponds to a "sintered density". This means that the above embodiment can prevent the bulge from occurring at the peripheral portion corresponding to the periphery of the three-dimensional shaped object, while keeping the same sintering density between the periphery and the internal portion in the three-dimensional shaped object.

Figure 4:
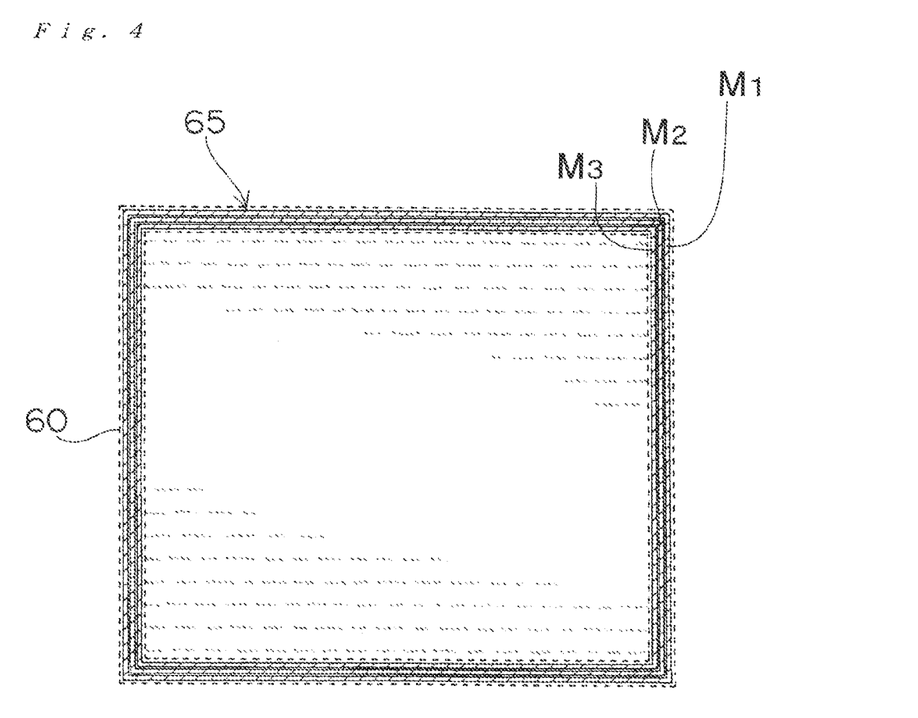
FIG. 4 schematically illustrates a preferred embodiment of the present invention wherein a plurality of irradiation paths in an annular form are adjacent to each other along the peripheral portion corresponding to a periphery of a three-dimensional shaped object.

In the manufacturing method according to an embodiment of the present invention, various kinds of embodiments regarding the light beam scanning "A" can be conceivable. For example, the light beam in the light beam-scanning "A" may be scanned such that a plurality of irradiation paths in an annular form are adjacent to each other along the peripheral portion corresponding to the periphery of the three-dimensional shaped object. Specifically, as shown in FIG. 4, the scanning of the light beam is performed in the light beam scanning "A" (65) such that a plurality of annular irradiation paths $M_{i=1, 2, 3}$ . . . are adjacent to each other along the peripheral portion (60) corresponding to the periphery of the three-dimensional shaped object. That is, the light beam scanning "A" may be performed such that a plurality of irradiation paths, each of which has a closed form extending along the peripheral portion, are adjacent to each other. With respect to the annular irradiation paths, the light beam is preferably scanned such that the peak power "P" of the light beam is made lower for the annular irradiation path located relatively outside than that for the annular irradiation path located relatively inside. Based on the embodiment of FIG. 4 for example wherein the peak powers for the annular irradiation paths $M_1$, $M_2$ and $M_3$ are respectively indicated by $P_{A(M1)}$, $P_{A(M2)}$ and $P_{A(M3)}$, the light beam scanning "A" is preferably performed with the relationship of $P_{A(M1)} < P_{A(M2)} < P_{A(M3)}$ being maintained. Such adjustment of the peak power "P" can more effectively suppress the occurrence of the bulge at the peripheral portion corresponding to the periphery of the three-dimensional shaped object.

Figure 5A:
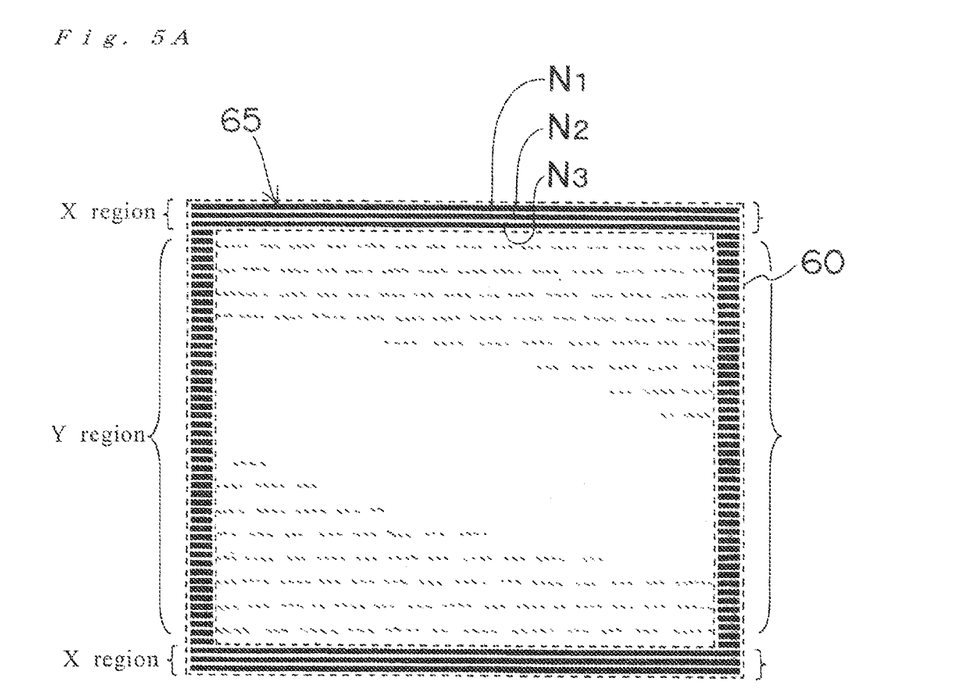
Figure 5B:
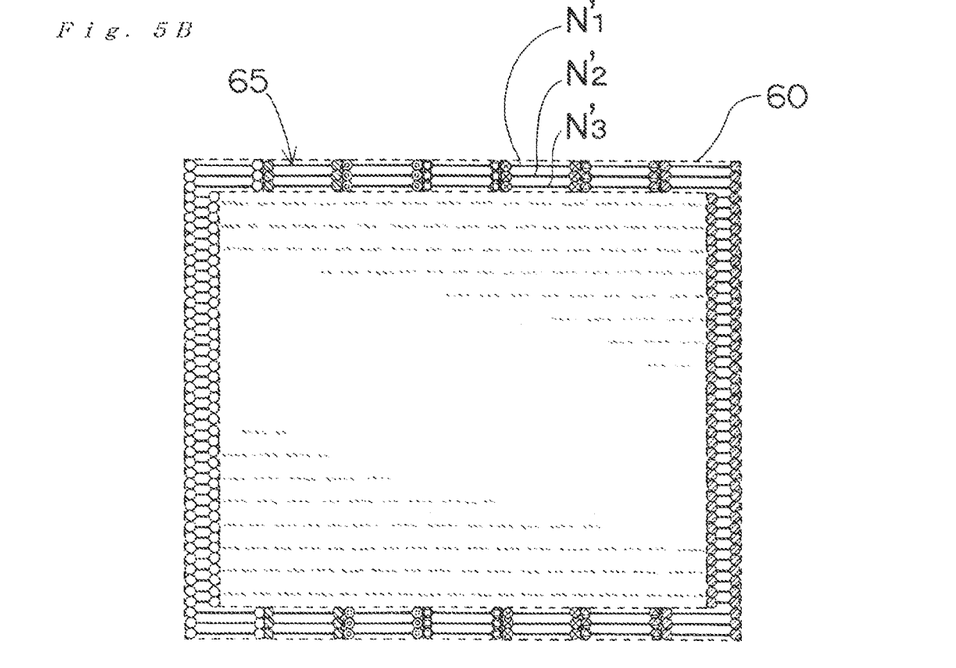

The light beam in the light beam-scanning "A" may also be scanned such that a plurality of irradiation paths in a linear form are in parallel with each other at the peripheral portion. Specifically, as shown in FIG. 5A, the scanning of the light beam is performed in the light beam scanning "A" (65) such that a plurality of linear irradiation paths $N_{i=1, 2, 3}$ . . . are adjacent to each other at the peripheral portion (60) corresponding to the periphery of the three-dimensional shaped object. That is, the light beam scanning "A" may be performed such that a plurality of linear irradiation paths occupy the peripheral portion corresponding to the periphery of the three-dimensional shaped object. FIG. 5A illustrates an embodiment wherein the linear irradiation paths respectively extend from end to end of the peripheral portion corresponding to the periphery of the three-dimensional shaped object. The present invention, however, is not limited to such embodiment, and thus another embodiment can be conceivable as illustrated in FIG. 5B wherein each of the linear irradiation paths has been divided into shorter sub-irradiation paths $N'_{i+1, 2, 3}$ . . . .

With respect to the linear irradiation paths, the light beam is preferably scanned such that the peak power "P" of the light beam is made lower for the linear irradiation path located relatively outside than that for the linear irradiation path located relatively inside. As can be seen from an example of the embodiment of FIG. 5A, there are provided "linear irradiation path located relatively outside" and "linear irradiation path located relatively inside". In the embodiment of FIG. 5A, both of "linear irradiation path located relatively outside" and "linear irradiation path located relatively inside" are provide at the lateral-direction region (i.e., "X region" in FIG. 5A) in the annular portion corresponding to the peripheral portion. It should be noted that the "X region" is a region wherein the longitudinal direction thereof corresponds to the extending direction of the linear irradiation path. As for the embodiment of FIG. 5A wherein the peak powers for the annular irradiation paths $N_1$, $N_2$ and $N_3$ are respectively indicated by $P_{A(N1)}$, $P_{A(N2)}$ and $P_{A(N3)}$, the light beam scanning "A" is preferably performed with the relationship of $P_{A(N1)} < P_{A(N2)} < P_{A(N3)}$ being maintained. Such adjustment of the peak power "P" can more effectively suppress the occurrence of the bulge at the peripheral portion corresponding to the periphery of the three-dimensional shaped object. While on the other hand, the longitudinal-direction region (i.e., "Y region" in FIG. 5A) of the annular portion corresponding to the peripheral portion may not necessarily require the relative adjustment of the peak power "P". As such, at the "Y region", the light beam scanning "A" may be performed with the peak power $P_A$ being lower than the value of point "a" derived from "$h_a$".

It should also be noted that the "Y region" is a region wherein the longitudinal direction thereof is perpendicular to the extending direction of the linear irradiation path.

As an additional remark, the light beam scanning "B", which is for the internal portion corresponding to the internal region of three-dimensional shaped object, will be finally described. The light beam irradiation for the internal portion may such a form that a plurality of linear irradiation paths are in parallel with each other. That is, a so-called "raster scanning" may be performed as the light beam scanning "B", in which case the light beam may be scanned in the linear and parallel form at the internal portion corresponding to the internal region of three-dimensional shaped object. In this regard, the light beam scanning "A" (65) as shown in FIGS. 5A and 5B can also be regarded as the raster scanning. As such, each of the embodiments of FIGS. 5A and 5B can correspond to an embodiment wherein the raster scanning is performed for both of "internal portion corresponding to the internal region of three-dimensional shaped object" and "peripheral portion corresponding to the periphery of the three-dimensional shaped object".

Although some embodiments of the present invention have been hereinbefore described, the present invention is not limited to these embodiments. It will be readily appreciated by those skilled in the art that various modifications/additional embodiments are possible without departing from the scope of the present invention. For example, the manufacturing method of the present invention can be applied to the selective Laser sintering method not only with the machining process being additionally provided (see FIGS. 6 and 7), but also with no machining process being provided.

It should be noted that the present invention as described above includes the following aspects:

The first aspect: A method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby sintering the powder in the predetermined portion or a melting and subsequently solidifying the powder; and (ii) forming another solidified layer by newly forming a powder layer on the formed solidified layer, followed by irradiation of a predetermined portion of the newly formed powder layer with the light beam, wherein a scanning of the light irradiation is divided into light beam-scannings "A" and "B", the light beam-scanning "A" being for the light irradiation of a peripheral portion corresponding to a periphery of the three-dimensional shaped object, the light beam-scanning "B" being for the light irradiation of an internal portion corresponding to a region of the three-dimensional shaped object, the region being located inside the periphery, and wherein a relative adjustment of a peak power "P" between the light beam-scannings "A" and "B" is performed such that a peak power Pa of the light beam for the peripheral portion is lower than a peak power P of the light beam for the internal portion.

The second aspect: The method according to the first aspect, wherein the light beam is scanned such that the light beam-scanning "B" is performed prior to the light beam-scanning "A".

The third aspect: The method according to the first or second aspect, wherein the light beam in the light beam-scanning "A" is scanned such that a plurality of irradiation paths in an annular form are adjacent to each other along the peripheral portion.

The fourth aspect: The method according to the first or second aspect, wherein the light beam in the light beam-scanning "A" is scanned such that a plurality of irradiation paths in a linear form are in parallel with each other at the peripheral portion.

The fifth aspect: The method according to any one of the first to fourth aspects, wherein the relative adjustment of the peak power "P" is performed such that an output of the light beam is relatively changed between the light beam-scannings "A" and "B".

The sixth aspect: The method according to any one of the first to fifth aspects, wherein the relative adjustment of the peak power "P" is performed such that a spot diameter of the light beam is relatively changed between the light beam-scannings "A" and "B".

The seventh aspect: The method according to any one of the first to sixth aspects, wherein an energy density of the light beam is made the same between the light beam-scannings "A" and "B".

INDUSTRIAL APPLICABILITY

The manufacturing method according to an embodiment of the present invention can provide various kinds of articles. For example, in a case where the powder layer is a metal powder layer (i.e., inorganic powder layer) and thus the solidified layer corresponds to a sintered layer, the three-dimensional shaped object obtained by an embodiment of the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to a cured layer, the three-dimensional shaped object obtained by an embodiment of the present invention can be used as a resin molded article.

CROSS REFERENCE TO RELATED PATENT APPLICATION

The present application claims the right of priority of Japanese Patent Application No. 2014-43102 (filed on Mar. 5, 2014, the title of the invention: "METHOD FOR MANUFACTURING THREE-DIMENSIONAL SHAPED OBJECT"), the disclosure of which is incorporated herein by reference.

EXPLANATION CF REFERENCE NUMERALS

22 Powder layer
24 Solidified layer
60 Portion corresponding to periphery of three-dimensional shaped object
65 Light beam-scanning "A"
75 Light beam-scanning "B"
L Light beam
$L_A$ Light beam for "portion corresponding to periphery of three-dimensional shaped object"
$L_B$ Light beam for "portion corresponding to internal region of three-dimensional shaped object"
$P_A$ Peak power of light beam for "portion corresponding to periphery of three-dimensional shaped object"
$P_B$ Peak power of light beam for "portion corresponding to internal region of three-dimensional shaped object"
$M_1$, $M_2$, $M_3$ Annular irradiation paths
$N_1$, $N_2$, $N_3$ ($N'_1$, $N'_2$, $N'_3$) Linear irradiation paths

The invention claimed is:

1. A method for manufacturing a three-dimensional shaped object by alternate repetition of a powder-layer forming and a solidified-layer forming, the repetition comprising:
   (i) forming a solidified layer by irradiating a predetermined portion of a powder layer with a light beam, thereby allowing a sintering of the powder in the predetermined portion or a melting and subsequent solidification of the powder; and
   (ii) forming another solidified layer by newly forming a powder layer on the formed solidified layer, followed by irradiation of a predetermined portion of the newly formed powder layer with the light beam,
   wherein a scanning of the light irradiation is divided into light beam-scannings "A" and "B", the light beam-scanning "A" being for the light irradiation of a peripheral portion corresponding to a periphery of the three-dimensional shaped object, the light beam-scanning "B" being for the light irradiation of an internal portion corresponding to a region of the three-dimensional shaped object, the region being located inside the periphery, and
   wherein a relative adjustment of a peak power "P" between the light beam-scannings "A" and "B" is performed such that a peak power $P_A$ of the light beam for the peripheral portion is lower than a peak power $P_B$ of the light beam for the internal portion.

2. The method according to claim 1, wherein the light beam is scanned such that the light beam-scanning "B" is performed prior to the light beam-scanning "A".

3. The method according to claim 1, wherein the light beam in the light beam-scanning "A" is scanned such that a plurality of irradiation paths in an annular form are adjacent to each other along the peripheral portion.

4. The method according to claim 1, wherein the light beam in the light beam-scanning "A" is scanned such that a plurality of irradiation paths in a linear form are in parallel with each other at the peripheral portion.

5. The method according to claim 1, wherein the relative adjustment of the peak power "P" is performed such that an output of the light beam is relatively changed between the light beam-scannings "A" and "B".

6. The method according to claim 1, wherein the relative adjustment of the peak power "P" is performed such that d spot diameter of the light beam is relatively changed between the light beam-scannings "A" and "B".

7. The method according to claim 1, wherein an energy density of the light beam is the same between the light beam-scannings "A" and "B".

* * * * *